United States Patent Office 3,022,363
Patented Feb. 20, 1962

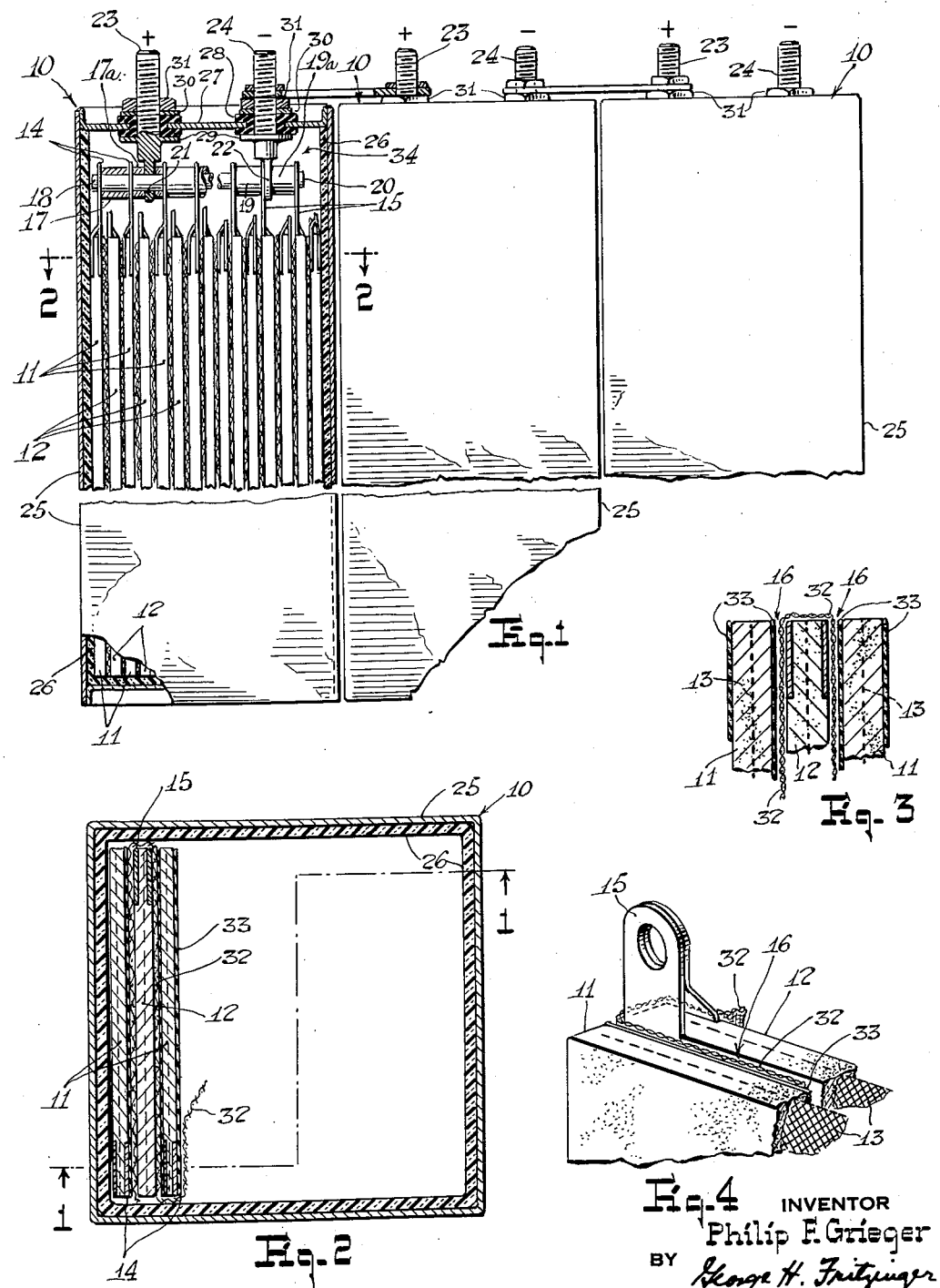

3,022,363
HERMETICALLY SEALED STORAGE CELLS
Philip F. Grieger, East Orange, N.J., assignor, by mesne assignments, to The Electric Storage Battery Company, Philadelphia, Pa., a corporation of New Jersey
Filed Feb. 6, 1956, Ser. No. 563,753
2 Claims. (Cl. 136—6)

This invention relates to hermetically sealed storage cells and particularly to such cells of the alkaline, semi-dry type.

The use of nickel oxides for the active material of the positive electrodes and of cadmium and/or iron oxides or hydrates for the active material of the negative electrodes of such cells is well known. Also, it is known that the positive electrodes may evolve oxygen gas and the negative electrodes hydrogen gas during the charging of the cells. Furthermore, it is known that if an electrode is overdischarged—i.e., if discharge current is caused to flow through a positive electrode after it is fully reduced or through a negative electrode after it is fully oxidized—then that positive electrode may evolve hydrogen and the negative electrode may evolve oxygen, which are just the reverse from that which may occur during the charging operation.

A fundamental problem in providing a practical form of hermetically sealed storage cell is in coping successfully with the evolution of gases during charging and overdischarging. This problem has been attacked on the premises (1) that overdischarge of the negative electrode is detrimental in that it produces oxides thereafter difficult to reduce and which impair the storage cell, and (2) that evolution of gases during overdischarge is detrimental because of the increase in internal pressure resulting therefrom (Neumann Patent 2,636,058, dated April 21, 1953). Starting with these premises, Neumann has proposed to solve the gassing problem by giving the negative electrode of each cell a charge capacity higher than that of its positive electrode and by bringing the negative electrode also to a higher state of charge than that of the positive electrode before the cell is sealed; furthermore, Neumann would add an auxiliary metal such as copper to the negative active material to prolong the useful discharge of the negative electrode, and he would add a catalyst such as graphite to the positive active material. However, this proposal runs the risk that when a battery of cells connected in series is discharged through a resistance to a point where a weaker one of the cells—i.e., a cell with less ampere hours capacity—is overdischarged, hydrogen may be evolved from the positive electrode of that weaker cell.

I have found that overdischarge of a negative electrode is not detrimental from the standpoint of the oxides produced provided the negative active material is composed predominantly of cadmium oxide or hydroxide with a varying minor proportion of iron oxide. Typically, the negative active material may be of the order of 90% of cadmium and 10% of iron to which may be added a small percentage of latex as an expander, as is described in the Moulton Patent 2,727,080, dated December 13, 1955. Furthermore, I have found that any evolution of hydrogen whether during charge or overdischarge is detrimental because any evolved hydrogen is difficultly combinable with the active materials and will result in a permanent pressure increase. Accordingly, my invention comprehends the use of such active materials and the arrangement of the electrode capacities and initial relative states of charge in such a way that oxygen gas is deliberately evolved from the negative electrode when a cell is overdischarged. In so doing, evolution of hydrogen from the positive electrode is reliably avoided. Also, by this same arrangement I avoid reliably the evolution of any significant amounts of hydrogen from the negative electrode during charge.

An object of my invention is to provide improved hermetically sealed storage cells, of novel construction, and of novel arrangement of their electrode capacities and relative initial states of charge so that the cells will have improved operating characteristics and especially more dependable operation as relates to gas evolution problems during charge and overdischarge.

Especially, it is an object of my invention to provide practical forms of hermetically sealed storage cells which can be repeatedly charged and discharged.

Another object is to provide for the first time a practical form of hermetically sealed storage cell which can be used successfully in series with other such cells.

Particularly, it is an object of my invention to provide a battery of improved hermetically sealed storage cells in series arrangement which can be discharged through an external resistance to the limit of the ability of the battery to supply current without encountering evolution of hydrogen gas from any of the positive electrodes of the individual cells.

In carrying out my invention the positive electrode is charged to a higher degree than the negative when the cell is sealed. Also, I may advantageously provide the positive electrode with a higher charge capacity than that of the negative, as will appear. By making the initial charge-content of the positive enough greater than the initial charge-content of the negative, I have found that I can insure failure of the negative before the positive when such a cell is discharged. I have also found that when a plurality of such cells are discharged in series through an external resistor, hydrogen gas is not liberated on the positive electrodes of any of the cells.

These and other objects and features of my invention will be apparent from the following description and the appended claims.

In the description of my invention reference is had to the accompanying drawings, of which:

FIGURE 1 is a fractional, side elevational view of a battery of series-connected hermetically-sealed storage cells embodying my invention, wherein certain parts of one of the cells are shown in section substantially as they would appear from the plane 1—1 of FIGURE 2;

FIGURE 2 is a sectional, plan view of one of the cells taken on the line 2—2 of FIGURE 1;

FIGURE 3 is an enlarged sectional view of a portion of the electrode-separator construction as it appears in FIGURE 2; and FIGURE 4 is a fractional perspective of an upper corner portion of the electrode-separator arrangement.

Preferably, the positive electrodes use an active material of nickel oxide and the negative electrodes an active material of cadmium oxide. The electrolyte may, for example, be 20% by weight of potassium hydroxide in water. As is well known, nickel oxide is oxidized to a higher state of oxidation on charging and cadmium oxides are reduced to the metal on charging.

Each electrode may be constituted by a plurality of plates made of metal such as nickel-plated steel and provided in a suitable form to carry the active material. For instance, the plates may be of the pocket type formed from perforated metal and containing the active material, or of the tubular type comprising tubes of perforated metal loaded with active material mixed with non-reactive, conductive material, or of the sintered type comprising bodies of sintered metal loaded with active material throughout the pore space thereof. For illustrative purposes, each storage cell 10 of the battery shown in FIGURE 1 is considered as having positive and negative electrodes 11 and 12 comprising plates of the sintered type. As indicated in FIGURE 4, each plate comprises a metal frame 13, such as a screen made as of nickel, which is overlaid on both sides with sintered material also of nickel. Formed integrally with each such sintered body is a metal lug referred to as 14 for the positive electrodes and as 15 for the negative electrodes. One set of such plates is loaded with nickel hydroxide and another set is loaded with cadmium hydroxide. The formation of such sintered bodies as well as the loading thereof with active material is well understood in the art.

The groups of positive and negative plates for each cell are arranged alternately in a stack with intervening separators generally referred to as 16. The plates are arranged, for example, with the lugs 14 and 15 aligned in respective rows at opposite ends of the same side of the stack. As indicated in FIGURE 1, the lugs 14 are clamped between spacers 17 by a bolt 18, and the lugs 15 are similarly clamped between spacers 19 by a bolt 20. However, at points along the bolts 18 and 20 respectively the spacers are shortened as indicated by the suffix letter "a" to permit the interposition of the eyes 21 and 22 of respective positive and negative terminals 23 and 24. The stack of positive and negative plates is placed under slight compresison into a gas-tight case 25 made of metal such as nickel-plated steel. This case is lined internally with a layer 26 of suitable insulation. The case has a lid 27 sealed thereto, and the lid is provided with two apertures through which project the respective positive and negative terminals. The apertures are made oversized and are fitted with rubber grommets 28, and the terminals are provided with flanges 29 below the grommets and with threaded portions above the grommets. By means of washers 30 overlying the grommets and nuts 31 threaded onto the terminals, the gromemts are pressed tightly against the flanges 29 to seal the terminals airtight to the lid.

The separators 16 are of a composite structure, comprising preferably a sheet 32 of porous, electrolyte-permeable material facing the negative electrodes and made preferably of loosely-woven cloth such as of nylon, and a sheet 33 of non-fibrous, gas-impermeable material facing the positive electrodes and made, for example, of regenerated cellulose. After the electrodes and separators are assembled in a stack the same is soaked in liquid alkaline electrolyte to cause the woven sheet to absorb the electrolyte. The non-fibrous sheet 33 serves to provide better insultion between the electrodes. Although this sheet is a gas barrier it is not a barrier to ionic flow between the electrodes. Thus, there is permitted conductive and ionic migration through the electrolyte in direct paths between the confronting faces of the electrode plates without allowing, however, for direct flow of gas between the faces of these plates. This is not detrimental since gas is permitted to flow along the positive plates between the faces thereof and the non-fibrous sheets 33 to the gas space 34 at the top of the cell and since gas can flow from this space 34 through the porous sheets 32 and/or along the side faces of the negative plates into contact with the negative active surfaces. Since the present cell structure does not use any free-flowing electrolyte it is referred to as being of the semidry type.

The charged active material of the negative electrode—i.e., cadmium metal—tends readily to combine with oxygen gas even at ordinary temperatures and to do so yet more readily at increased oxygen pressure in the cell. To the extent that the negative electrode combines with oxygen, this electrode is discharged since the negative active material is one which is reduced during charging and oxidized during discharging.

The charged active material of the positive electrode—i.e., the oxidized nickel oxide—is difficultly combinable with hydrogen gas at ordinary temperatures and pressures. In order, therefore, to avoid a permanent build-up of pressure in the cells it is necessary to avoid evolution of hydrogen gas to any significant extent. This means that the negative electrode should never be overcharged and that the positive electrode should never be overdischarged. However, overcharge of the positive and overdischarge of the negative may be permitted since each results only in evolution of oxygen gas. By my invention, both the overcharge and overdischarge problems are solved successfully with the use of negative active materials not including catalysts or auxiliary metals. This is accomplished simply by differently arranging the relative charge capacities and initial charge states of the positive and negative electrodes from those taught by the prior art.

At this point it should be noted that the term "charge capacity" of an electrode is herein employed to mean the amount in terms of ampere hours of effectively active material in the electrode, taking into account the efficiency factor arising from the manner in which the material is used. In other words, the ampere hours which an electrode will accept in going from a prescribed discharged to a fully charged state in an inert atmosphere is its charge capacity. It should also be noted that the term "charge-content" is used to represent the ampere hours which the electrode has accepted in going from a prescribed discharged state to the condition of charge which the electrode actually has.

Typically, the positive electrode will evolve oxygen gas gradually during charge and this evolution will increase at a progressive rate as the electrode becomes more nearly fully charged. Since a sealed storage cell is a closed system wherein any given charge in ampere hours through the positive electrode is equal to the change in charge content plus the equivalent ampere hours of evolved oxygen which the charging current produces, it matters not as between specified discharged and overcharged conditions whether we consider the gas as having been evolved gradually throughout the charging period or as having been evolved only while the electrode is being overcharged, the term "overcharged" being herein employed to mean that charging current is passed through the positive electrode after it is nearly fully oxidized, with the result that the current is spent predominantly in evolving gas instead of converting active material. As an approximation and for simplification of the description, we may therefore consider that a normal charge operation is one wherein the charging current is effective to change the charge-content of the electrode without producing any substantial evolution of gas and that an overcharge operation is one wherein the current is effective to evolve gas in proportion to the charging current without causing any substantial change in the charge-content.

The oxygen evolved from the positive electrode during charge may not combine immediately with the negative active material, with the result that the internal pressure will then rise. The extent to which the internal pressure may rise will depend on the chemical composition of the active materials, the internal construction of the cell and the charge rate, it being greater as the charge rate is increased. It is important in the practical use of hermetically sealed storage cells that the internal pressure be never allowed to exceed a prescribed limit.

If we start a normal charge operation on a cell whose positive electrode has a charge capacity of the order of that of the negative electrode and an appreciably greater charge-content than that of the negative electrode, it follows that the negative electrode will be only partially charged when the positive reaches a state of full charge. Under these starting conditions, the charge operation may cause oxygen gas to be evolved from the positive electrode but will not cause any hydrogen gas to be evolved from the negative electrode.

If such a cell is next overcharged at a rate sufficiently high to cause oxygen to be evolved faster than it is combined with the negative active material, the cell pressure will increase and the negative electrode will acquire a gradually higher charge-content, but the charge-content of the positive will still remain substantially constant. There is for a given construction of cell, depending on the size of the gas space 34 and the amount of oxygen in this space when the cell is sealed, an amount of oxygen which can be added to the cell without exceeding the prescribed pressure limit. The electrical equivalent in ampere hours of the amount of oxygen gas which may be so added into the cell represents a minimum ampere hours of chargeable capacity $Q_c$ which the negative must still have when the positive has become fully charged and the cell pressure is still substantially at the starting point. If this were not true, an overcharging of the cell such as would increase the internal pressure to the prescribed limit would cause the negative to be overcharged with the result that hydrogen would be evolved to cause a permanent increase in cell pressure. If the electrodes have equal charge capacities, it follows that the minimum excess charge of the positive over the negative when the cell is sealed, referred to as $Q_m$, should be the same as $Q_c$, it being understood that the quantity $Q_c$ is a fixed quantity for any given construction of cell. If the electrode capacity of the positive is greater than the electrode capacity of the negative, the minimum excess charge $Q_m$ when the cell is sealed should be greater than $Q_c$ by the differential between the charge capacities of the electrodes.

The discharge requirement according to my invention is that the negative shall fail first so as to prevent overdischarge of the positive. If the cell pressure is at the starting value when the negative electrode becomes fully discharged, the positive will have still a charge-content of $Q_m$. To satisfy necessary conditions during discharge, my invention comprehends that $Q_m$ should never be less than $Q_c$. This requirement is made so that if a cell is overcharged to raise the oxygen pressure by the maximum specified amount—which is to liberate a quantity of oxygen equivalent in ampere hours to $Q_c$—and the cell is then instantly discharged while the oxygen pressure is still at the maximum limit, the positive electrode will at most reach a state of discharge no sooner than the negative. As aforestated, to satisfy overcharge limitations, $Q_m$ is to be made larger than $Q_c$ provided the capacity of the positive electrode is greater than that of the negative electrode. Indeed, if $Q_m$ is made larger than $Q_c$, a margin of safety by the amount of the differential between these quantities is obtained against overdischarge of the positive electrode. There are advantages therefore in using a positive electrode having a charge capacity greater than that of the negative electrode. Accordingly, my invention contemplates the reverse teaching to that of the prior art, both as to the relative charge capacities of the positive and negative electrodes and as to their relative initial states of charge when the cell is sealed. This does not mean, however, that the novel feature of initially giving the positive electrode a greater charge-content than that of the negative electrode when the cell is sealed cannot be used advantageously even if the negative has a greater charge capacity than the positive.

The foregoing assumption that the internal pressure might still be at the maximum limit when the cell is completely discharged is not likely to occur in practice. To the extent that the internal pressure will normally fall below the maximum limit during discharge, there is an additional margin of safety against overdischarging the positive electrode.

By way of numerical example, consider the charge capacity of the negative to be 15 ampere hours and the electrical charge equivalent $Q_c$ of the maximum oxygen which may be added to the cell to be 2 ampere hours. If the charge capacity of the positive is also 15 ampere hours, the minimum charge-content $Q_m$ of the positive on sealing the cell should be 2 ampere hours, assuming the negative to be then discharged. If the charge capacity of the positive were greater than that of the negative, say by 3 ampere hours, the minimum charge content $Q_m$ of the positive would be 5 ampere hours. Although each of these examples provides for the same 2 ampere hours safety margin on overcharge, the first example would provide for no safety margin and the second example for 3 ampere hours safety margin on overdischarge should the cells be discharged so fast that the internal oxygen pressure is still substantially at the maximum limit when overdischarge begins. However, if the pressure has fallen to the starting point before overdischarge begins, the first example would provide for 2 ampere hours safety margin and the second example for 5 ampere hours safety margin on overdischarge.

The foregoing examples represent the minimum margins of safety needed to guard against evolution of hydrogen during overcharge and overdischarge. In practice, because of manufacturing variations, the possibility of charging and discharging at abnormally high rates, and the tendency for the negative electrode to begin evolving some hydrogen gas before it becomes fully charged, it is desirable to initially set the charge-content of the positive at a value above $Q_m$ by an amount typically of the order of 10% to 20% of the charge capacity of the positive.

As a practical matter, the overdischarge problem is of importance only when one or more cells are connected in series to discharge through a common load resistance. For instance, when a single cell is discharged it matters not which electrode fails first because as soon as one electrode fails the cell no longer provides any voltage to enable any gas to be evolved from either electrode. On the other hand, when a battery of two or more individual cells are discharged in series through a common load resistance it is necessary that it be the negatives of the weaker cells which are first to fail, else the continuing discharge current provided by the stronger cells may evolve hydrogen gas from the positives of the weaker cells. If each of the cells of the battery is constructed according to my invention, it will be the negative electrode of each cell which will fail first. Since it is desirable that there be no excessive evolution of oxygen in any of the cells during a complete discharge of the battery, the cells are preferably made with nearly equal ampere hours capacity so that one one cell will be unduly overdischarged. Also, it is important that wide differences in the ampere hours capacities between the cells be avoided so that the margins of safety in the individual cells against overdischarging the positives can be reduced without incurring the risk that the stronger cells can ever so overdischarge the weaker cells as to evolve hydrogen from the positives thereof. In practice, it is desirable to have the greater margin of safety attained by making each cell with a greater positive electrode capacity $Q_p$ than negative capacity $Q_n$ and with a correspondingly higher $Q_m$ value than the $Q_c$ value of the cell so as to assure against any possible evolution of hydrogen during discharge of the battery.

It is a characteristic of nickel-cadmium-alkaline storage cells that when an electrode of a cell fails, that cell not only no longer contributes voltage but instead begins to consume voltage from other cells in the circuit. Accordingly, the voltages of the battery will fall to zero before all of the cells of the battery have failed. Since the last cell in which an electrode failure is effective to bring the battery voltage substantially to zero need not be of my invention, it follows that one cell of the storage battery need not be of my invention. For instance, for a two-cell nickel-cadmium-alkline battery I need only arrange matters so that the first electrode to fail during discharge of the battery will be a negative. This is preferably done by making both cells of the battery in accordance with my invention. If the battery is allowed to discharge further until a second electrode fails, it matters not whether that second electrode be a positive or a negative, because as soon as it fails the battery will no longer be able to deliver current. Similarly, for a three-cell battery, I need only arrange matters so that the first two electrodes to fail during discharge of the battery will be negatives. This is preferably done by making all three cells of the battery in accordance with my invention and as nearly identical as is practical, and in also arranging the cells so that $Q_p$ is enough greater than $Q_n$ to make up for more than the inevitable variations in charge capacity of the several electrodes that will arise in manufacture. In so doing, it will be assured that following failure of the first electrode—which must of necessity be a negative electrode—the next electrode to fail will be a negative in another cell and not the positive electrode in the cell in which the first negative failure has occurred.

By following the same procedure, I can make nickel-cadmium-alkaline batteries of any number of cells capable of being discharged in series through a common load resistance without the danger of hydrogen being evolved.

Although theoretically one of the cells of a nickel-cadmium-alkaline battery need not be of my invention to prevent evolution of hydrogen from any of the cells when the battery is fully discharged through a common load resistance, there remains still the requirement that the positive electrode of the cell not of my invention must have sufficient capacity to assure that it will not fail before the last of the negatives of the cells of my invention do fail. This is a much more difficult problem to cope with than it is to insure against any of the positives of the cells of my invention being driven to overdischarge when all the cells of the battery are of my invention.

In carrying out my invention it will be understood that one electrode of a cell can be given a greater charge capacity than the other either by providing it with a greater number of plates and/or by providing its plates with a greater amount of active material. In the illustrative example the plates are shown as being alike in size but the positive electrode has one more plate than the negative to provide it with a greater capacity.

Although the features of my invention as to relative charge capacities and states of charge of the electrodes are practiced to their maximum extent only so long as the cell container is kept hermetically sealed, the cell container may if desired have provision for release of excessive pressure with some attendant loss in optimum use of the invention rather than to risk a possible rupturing of the container should the cell ever be so unduly overcharged or overdischarged as would give rise to a dangerous pressure.

The embodiments of my invention herein particularly shown and described are believed to be illustrative and not limitative of my invention since the same are subject to changes and modifications without departure from the scope of my invention, which I endeavor to express according to the following claims.

I claim:

1. A storage battery comprising a plurality of independently-sealed storage cells electrically connected in series for discharge through a common load resistance, each of said cells comprising positive and negative electrodes, an electrolyte and separator means permitting flow of oxygen from the surface of one electrode to the other, and all but one of said cells being of a type having a positive electrode tending to evolve oxygen gas on overcharge and having a negative electrode tending to evolve oxygen gas on overdischarge, the positive electrode of each cell of said type having a charge capacity at least equal to that of the negative electrode and having initially a higher state of charge than the negative electrode of the cell by an amount which is at least 10% to 20% of its charge capacity in excess of the difference in the charge capacities of the electrodes when the cell is sealed.

2. A storage battery comprising a plurality of independently-sealed storage cells electrically serially connected for discharge through a common load resistance, said cells having substantially equal charge states when the cells are electrically connected together, each of said cells comprising spaced positive and negative electrodes and an immobilized electrolytes disposed to enable flow of oxygen from the active surface of one electrode to the active surface of the other, all but one of said cells being of the type tending to evolve oxygen gas from the positive electrode when the same is overcharged and to evolve oxygen gas from the negative electrode when the same is overdischarged, the positive electrode of each cell of said type having a higher state of charge than the negative electrode when the cell is sealed, and at least the weakest cell of the battery being of said type and having a positive electrode with a higher charge capacity than that of the negative electrode.

References Cited in the file of this patent

UNITED STATES PATENTS

| | | |
|---|---|---|
| 2,571,927 | Neumann et al. | Oct. 16, 1951 |
| 2,614,138 | Jacquier | Oct. 14, 1952 |
| 2,642,469 | Gary | June 16, 1953 |
| 2,646,455 | Jeannin | July 21, 1953 |
| 2,651,669 | Neumann | Sept. 8, 1953 |
| 2,708,211 | Koren et al. | May 10, 1955 |